Figure 1:
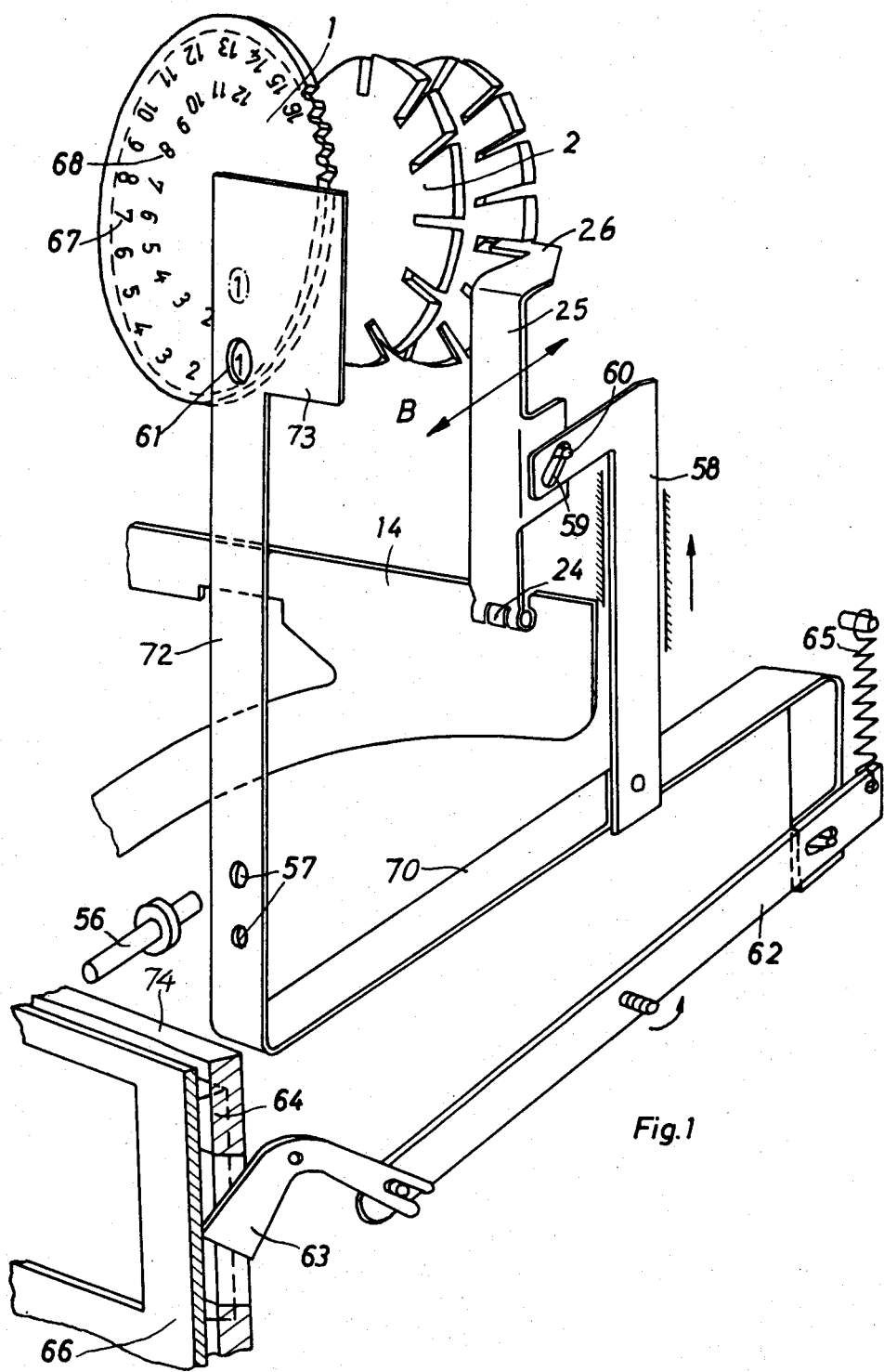

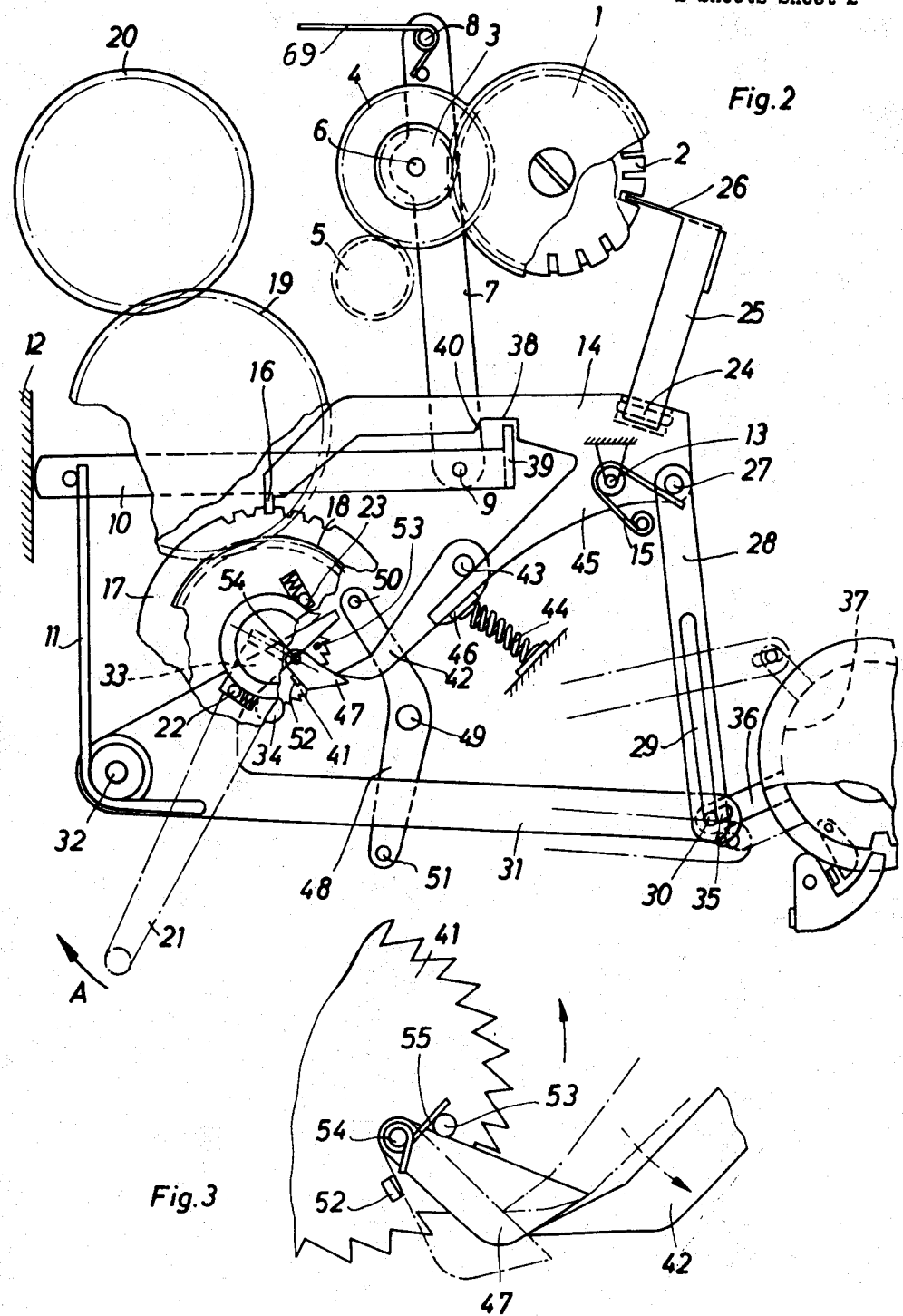

United States Patent Office 3,073,229
Patented Jan. 15, 1963

3,073,229
MULTI-FORMAT PHOTOGRAPHIC CAMERA
Joachim Mädge, Braunschweig, Germany, assignor to Franke & Heidecke, Fabrik Photographischer Prazisions-Apparate, Braunschweig, Germany, a firm of Germany
Filed Mar. 24, 1959, Ser. No. 801,578
Claims priority, application Germany Mar. 29, 1958
10 Claims. (Cl. 95—31)

The present invention relates to a multi-format roll film photographic camera and, more particularly, to such a camera having a selectively engageable variable film advance arrangement which is coupled with a shutter for automatically tensioning the shutter simultaneously with the winding on of the film.

An object of the invention is to provide a generally improved and more satisfactory multi-format photographic camera for easy and convenient use with at least two different film sizes.

Another object is the provision of a multi-format camera having a mechanism for limiting the film advancing movement to accommodate either of at least two different film frame sizes which is relatively simple and requires few parts and which may be conveniently changed over from use with one frame size to use with the other frame size.

Yet another object is to provide a new and improved variable film advance and film feeding arrangement coupled to a shutter for simultaneously tensioning the shutter with the winding on of the film and for automatically readying the camera for movement to the next frame when the shutter is released.

A further object is to provide a new and improved safety device for preventing return movement of a reciprocable film winding handle before the film winding operation is completed.

These and other desirable objects may be attained in the manner disclosed as an illustrative embodiment of the invention in the following description and in the accompanying drawings forming a part hereof, in which:

FIG. 1 is a somewhat schematic perspective view of a portion of a variable film advance winding mechanism according to the present invention, showing its cooperation with a removable format mask, portions of the format mask and frame therefor being broken away;

FIG. 2 is a schematic side elevational view of a portion of the mechanism shown in FIG. 1, and further including other parts of the film winding mechanism, and also its connections with a shutter tensioning mechanism, a portion of the shutter being shown broken away, and its cooperation with a camera back, a portion of the camera back being shown diagrammatically and broken away; and FIG. 3 is a fragmentary side elevational view of a film winding ratchet and a latch therefor, the latch being shown in dotted lines in a released position.

The same reference numerals throughout the several views indicate the same parts.

The present invention is illustrated, by way of example, as applied to a twin lens reflex camera such as the well known "Rolleiflex" camera, manufactured by the firm of Franke & Heidecke, of Braunschweig, Germany, and widely used throughout the United States and elsewhere. The following description presupposes that the reader is familiar with the construction of "Rolleiflex" cameras. Those who are not already familiar with such construction, may obtain detailed information by consulting the book "Rollei Photography, Handbook of the Rolleiflex and Rolleicord Cameras," by Jacob Deschin, published in 1952 by the Camera Craft Publishing Company, of San Francisco, California. Also the present disclosure presupposes familiarity especially with the main features of the film advancing, film metering, frame counting, and shutter tensioning mechanism of such cameras, as described for example in Muller and Priesemann Patent 2,148,636, dated February 28, 1939.

Referring first to FIG. 2, a film counter wheel 1 is shown somewhat diagrammatically, and connected to the shaft of the counter wheel for rotation therewith are a plurality of axially spaced detent disks 2, two disks being shown in the preferred embodiment. Each of the disks is provided with a plurality of circumferentially spaced peripheral detents or notches for cooperation with a latch for determining the film advance from frame to frame. The detents in one of the disks are spaced a different circumferential distance than are the detents in the other disk in order to accommodate different frame sizes in two different films. Thus, the front disk in FIG. 2 is provided with twelve detents corresponding to the twelve frames of one size of film, whereas the rear disk is provided with sixteen different detents having a closer circumferential spacing than the detents of the front disk in order to provide the proper film advance for a film having sixteen smaller frames. The counter wheel 1 and the connected disks 2 are driven for rotation together through an intermediate gearing 3, 4, and 5 from a metering roller, not here shown, driven by the film. Thus the present gear 5 may correspond, for example, to the gear 13 in said Muler patent and may be driven by a film-contacting drive wheel like the drive wheel 11 in said patent. Thus, as the film advances from a supply spool (shown at 2 in said patent) to a take-up spool (not here shown, but shown at 3 in said patent and conveniently axially alined with and driven by the gear 20 of the present application) the metering roll is driven and consequently also the intermediate gearing 3, 4 and 5 and the counter wheel 1 and the detent disks 2.

The intermediate gears 3 and 4 are coaxially mounted on a pin 6 carried by a lever 7. The lever 7 is pivoted at its upper end to a pin 8 secured to the camera housing, and the bottom end of the lever 7 is connected by a pin 9 to a slide member 10 having limited approximately horizontal sliding movement. The rear end of the slide member 10 is urged by a spring 11 rearwardly into contact with the camera back 12 when the back is in normal closed position. As usual, the back can be moved to an open position for loading and unloading film. When the camera back is open, the slide member 10 consequently slides rearwardly and thereby breaks the meshing engagement between the intermediate gear wheel 3 and the teeth on the unit comprising the counter wheel 1 and the detent disks 2. The force of the spring 11 is greater than the force of a spring 69 mounted on the pin 8 and acting on the lever 7 to urge the gear 3 into meshing engagement with this unit. The counter wheel 1 and the detent disk 2 are provided in known manner with a return spring by which they are rotated back to the initial position on opening the camera and disengaging the gear 3.

Pivoted on the camera housing about a pin 13 is a double-armed or bellcrank lever 14 which is urged in a counterclockwise direction by a spring 15 secured at one end to the camera housing and reacting at its other end on a pin 27 secured to the lever. The rear end of the upper arm of the lever 14 terminates in a locking pawl or latch 16 which is engageable with detent notches carried by a ratchet wheel 17. The ratchet wheel 17 is connected through an intermediate gearing comprising the gears 18 and 19 to the drive means 20 of the above-mentioned film take-up spool, not here shown. A film winding handle 21 is operatively connected to the ratchet wheel 17 by a unidirectionally acting clutch 22 and 23 of the free wheel type, so that actuating the film winding handle 21 in the direction of the arrow A, that is, in a clockwise direction, turns the gearing 17, 18, 19, and 20, while the crank does not engage when moved in the reverse direction.

An upwardly extending arm 25 is mounted on the lever 14 in such manner as to be rigid with the lever 14 in the direction around the pivot 13 (i.e., in the direction of the plane of the paper in FIG. 2) but swingable relative to lever 14 in the direction of the rotary axis of the members 1 and 2 (i.e., in a direction perpendicular to the plane of the paper in FIG. 2). Such mounting of the arm 25 on the lever 14 may be accomplished by a leaf spring connection flexible in the desired direction and rigid in other directions, or by the use of a pivot pin 24 whose axis lies in a plane parallel to the lever 14 and perpendicular to the rotary axis of the members 1 and 2. At its upper end the arm 25 has a laterally extending latch portion 26 which extends radially with respect to the axis of rotation of the counter wheel 1 and the disks 2. The latch 26 is movable out of one of the detents in the disk 2 simultaneously with the removal of the locking pawl 16 from the notches in the ratchet wheel 17 when the lever 14 is rotated in a clockwise direction about the pin 13. As better seen in FIG. 1, the latch 26 is also movable transversely of the disks 2 in the direction of the arrow B (parallel to the rotary axis of the members 1 and 2) into the plane or range of any selected one of the detent disks. Only two detent disks are provided in the preferred embodiment, but it is apparent that it is possible to provide three or more detent disks which may be engaged at will.

Movement of the latch 26 in a lateral direction in order to cooperate with the selected one of the disks 2 is effected by a slide member 58 guided for vertical movement and having at its upper end a laterally extending arm provided with an inclined slot 59 in which is engaged a pin 60 carried by the arm 25. Fastened to the lower end of the slide 58 for movement therewith is an arm 70 having a bent-over portion 72, near the upper end of which is an enlarged shutter or mask portion 73 containing a window aperture 61. The window 61 is arranged to expose the appropriate frame numeral on the counter wheel 1. The face of the counter wheel 1 is provided with a plurality of concentric index scales, one for each of the notched metering disks 2. If there are two metering disks, then there are two frame index scales as seen at 67 and 68 for the different spacing and different number of frames on the two different film sizes corresponding to the notches or detents in the metering or detent disks 2. Thus, the counter scale 67 is provided with numerals 1 through 16 for indicating the frames on one size of film corresponding to the number of detents in the rear metering disk 2. The inner index scale 68 comprises numerals 1 through 12 corresponding to the detents in the forward metering disk 2. The window 61 exposes the appropriate film numeral on the appropriate index while the upper portion of the arm 72 covers up the adjacent numerals on the other scale. Movement of the window 61 is coordinated with the movement of the latch 26 so that the appropriate scale may be read. Appropriate observation windows in the side wall of the camera housing are in alinement with the respective positions of the window 61 in the slide member 72.

To disengage the latch 26 from the metering disks when the back is opened, the lever 14 is provided with a recess 38 having an inclined rear edge 40. An upwardly extending lug 39 carried by the forward end of the slide member 10 is arranged to engage the inclined edge 40 to pivot the lever 14 in a clockwise direction, thereby to remove the pawl 16 from the notches in the ratchet wheel 17 and to remove simultaneously the latch 26 from the notches in whichever one of the disks 2 it may have engaged. Thereafter the latch 26 may be moved into alinement with another selected metering disk.

The change-over of the latch 26 and the shutter or mask 73 from one position to another should always be performed when the camera back 12 is in open position, for in such position of the back the latch 26 is swung away from the metering disks, insuring that the lateral movement of the latch will be clear of contact with the metering disks. The change-over can be accomplished by a manual handle connected to the change-over slide 58, 70. Since the change-over takes place when the camera back is open and the interior of the camera is accessible, it does not matter whether the handle is located inside or is accessible from the outside of the camera. However, if it is accessible from the outside, then there is preferably a locking member to lock the change-over linkage against accidental movement while the camera back is closed. For example, there may be a locking pin 56 engaged by the back 12 when the back closes, to move the locking pin longitudinally into one or another of the locking apertures 57 in the change-over linkage 58, 70. When the camera back is opened, a spring retracts the locking pin 56 from the aperture 57 in a manner similar to the movement of the slide 10 when the back is opened. In fact, the locking pin may be formed as an extension on or a part of the slide 10.

Preferably an automatic change-over mechanism is provided so that the adjustment of the latch 26 and window 61 is coordinated with the placement of a format mask for the smaller frame size. For this purpose, a downwardly extending end of the arm 70 is connected by a pin and slot connection with one end of a lever 62 pivotally mounted intermediate its ends on the camera housing. The other end of the lever 62 is operatively connected by a pin and slot connection to one end of a bellcrank feeler lever 63 pivotally mounted on the camera housing. The other end of the feeler lever 63 extends through a guideway 64 in an image aperture frame 74. A spring 65 urges the one end of the lever 62 upwardly so that the feeler lever 63 projects into the guideway 64 while the latch 26 is engaged with the detent disk 2 for the larger frame size while the window 61 exposes one of the numerals on the scale 68. When a format mask 66 is fitted into the frame 74, the feeler lever 63 is forced into the guideway 64, thus depressing the far end of the lever 62 against the force of the spring 65, thereby to move the latch 26 laterally into alinement with the disk 2 corresponding to the small frame size and to move the window 61 to expose the numerals on the scale 67.

The winding of the film to advance it from frame to frame is desirably coupled with the shutter setting mechanism so that the shutter is automatically tensioned as the film is advanced from one frame to another. To this end, there is suspended from the pin 27 on the lever 14 a draw bar 28 which is connected by means of a slot 29 with a pin 30 on one end of a shutter setting lever 31. The other end of the shutter setting lever 31 is pivoted on a pin 32 carried by the camera housing and is urged downwardly in a clockwise direction by one of the ends of the spring 11. The lever 31 has the form of a bellcrank lever and has an upwardly directed bent over arm 33 disposed in the plane of a pin 34 provided on the film winding handle 21. By actuating the film winding handle 21 in the direction of the arrow A, the pin 34 carries the arm 33 upwardly with it, thereby pivoting the lever 31 in a counterclockwise direction about pin 32.

The forward end of the shutter setting lever 31 is releasably coupled with a shutter setting ring 37 of a suitable shutter of any convenient type. The ring 37 of the present drawings may, for instance, correspond in part to the ring 37 of the above-mentioned Müller Patent 2,148,636. The present ring 37 has a radially projecting arm 36 which is engageable with a laterally projecting lug 35 on the end of the lever 31. Thus, turning the film winding handle 21 in a clockwise direction moves the end of the setting lever 31 upwardly and, by the engagement of the lug 35 with the attachment 36, rotates the shutter setting ring 37 in a clockwise direction to tension the shutter. Owing to the slot guideway 29, the position of the drawbar 28 and the lever 14 are not affected by this movement.

After completing the shutter setting or tensioning operation as described, the setting lever 31 is returned to the rest position shown in full lines in FIG. 2 in a manner to be further explained, while the projecting arm 36 of the shutter setting ring 37 remains in the upper limit position. When the shutter is released, the shutter setting ring 37 rotates counterclockwise until the arm 36 strikes the lug 35 and pulls the setting lever 31 in a downward direction, carrying with it the drawbar 28, by means of the abutment of the pin 30 with the end of the guide slot 29. As the drawbar 28 is pulled downwardly, the lever 14 is rotated in a clockwise direction about the pin 13, whereby the pawl 16 and the latch 26 are respectively disengaged from the ratchet wheel 17 and the one of the metering or detent disks 2 with which the latch was engaged. In this way, the film winding mechanism is made available for fresh actuation, since it is apparent that the film winding gearing 18, 19, and 20 cannot rotate until the pawl 16 is disengaged from the notches in the ratchet wheel 17.

According to the invention, a safety device is provided which prevents return movement of the film winding handle 21 as long as the film winding operation is not completed. For this purpose, the handle 21 carries a ratchet wheel 41 having peripheral ratchets which are engageable with the end of a pawl 42 pivoted to the camera housing on a pin 43. A spring 44 acting on the pawl 42 urges the end of the pawl into engagement with the ratchet wheel 41. By this arrangement, the film winding handle 21 can be actuated in the direction of the arrow A, since it may ratchet past the pawl 42, but cannot immediately be swung back into the rest position as shown in FIG. 2. Provided on the lever 14 is another downwardly extending lever arm 45 which bears on a lug 46 on the pawl 42. The arrangement is such that with the engagement of the latch 26 and the locking pawl 16, the arm 45 swings counterclockwise and disengages the pawl 42 from the ratchet wheel 41, whereby the film winding handle 21 is free for moving back to its rest position. Thus, as long as the film winding operation is not completed, the film winding handle 21 can only be moved in the direction of the arrow A until this movement is limited by the locking pawl 16 engaging in the notches in the ratchet wheel 17.

The rest position of the film winding handle 21 after being rotated back in a counterclockwise direction is determined by the abutment of a stop 47 carried by the ratchet wheel 41 with the pawl 42, as shown in FIG. 2. As best seen in FIG. 3, the stop 47 is pivoted on a pin 54 secured to the ratchet wheel 41 and is movable between an upstanding lug 52 and a pin 53. The stop 47 is urged in the direction abutting the pin 53 by means of a spring 55.

At times it may be desirable to tension or cock the shutter again without winding the film, to make a second exposure on the same film frame, e.g., if a flashbulb fails to ignite, or if a special double-exposure effect is desired. To enable this, mechanism is provided to get the pawl 42 out of the path of the stop 47, to enable reverse or counterclockwise rotation of the crank 21 to tension the shutter again without winding the film. A double armed lever 47 is provided which is rotatable about a pivot pin 49 carried by the camera housing and which, on actuation in a clockwise direction, lifts the pawl 42 out of the range of the stop 47 by means of a pin 50 secured to one end of the lever 48. Simultaneously, by means of a pin 51 carried by the other end of the lever 48, the shutter setting lever 31 is lifted to a small amount so that the pawl 16 and the latch 26 are again free for engagement in the wheel 17 and the detent disk 2, respectively. While the pawl 42 is lifted, the stop 47 is urged by the spring 55 into abutment with the pin 53. Consequently, the result is obtained that the pawl 42, on releasing the lever 48, is not immediately in the rest position according to FIG. 2, but is rather disposed behind the abutment 47 as shown in FIG. 3. This makes it possible for the film winding handle 21 to be actuated counter to the direction of the arrow A, so that after one complete revolution, the abutment 47 again strikes the pawl 42 as shown in FIG. 2 to provide the rest position for the handle. In this rearward rotation, the pin 34 actuates the shutter setting lever arm 33 and the entire lever 31 in the same way as in the forward direction to again tension the shutter, while the film winding mechanism is not rotated due to the one-way clutch 22, 23, and its operation is prevented by the engaged latch 26 and pawl 16. The control lever 48 may be swung by any convenient handle or part attached thereto and passing through a wall of the camera body to be accessible from the outside.

Briefly reviewing certain parts of the operation, the camera back 12 is open when inserting a new roll of film, as a result of which the slide member 10 moves rearwardly under the actuation of the spring 11. The lever 7 therefore pivots about the pin 8 against the force of the spring 69 to disengage the intermediate gear 3 from the peripheral gear teeth on the counter wheel 1. Also, as the slide member 10 moves rearwardly, the lug 39 on the slide member 10 engages the inclined edge 40 on the lever 14 to rotate this lever in a clockwise direction thereby to release the locking pawl 16 from the notches in the ratchet wheel 17 and to disengage the latch 26 from the detents in one of the disks 2. As the lever 14 rotates in a clockwise direction, the arm 45 thereof raises off of the lug 46 on the locking pawl 42 so that this pawl is urged by the spring 44 into engagement with the ratchet teeth on the ratchet wheel 41 connected to the winding handle 21. By this locking engagement, the film winding handle 21 cannot be moved in the reverse direction to a rest position until the camera back is closed and the pawl 16 and latch 26 are reengaged.

For the film with the smaller number of relatively large sized frames, such as a film of twelve frames as illustrated in the drawing, the spring 65 urges the slide 58 and arm 70 and the upstanding portion 72 thereof into a position such that the latch 26 is alined with the metering disk 2 having twelve notches or detents, and the window 61 is alined with the scale index 68 on the counter wheel 1 for indicating the correct one of twelve frames. For another film size, such as one having sixteen frames, a format mask 66 is fitted into the image aperture, and this operation, according to the invention, causes an automatic changeover of the latch 26 and the window 61. As the format mask is fitted into place, the feeler lever is shifted within the guideway 64. The far end of the lever 62 is consequently pivoted against the force of the spring 65 thereby to rotate the arm 25 about the pivot 24 through the pin and slot engagement 59, 60, and to depress the arm portion 72 so that the window 61 is in alinement with the numeral of the index scale 67.

The operation of winding the film by turning the film handle 21 in the direction of the arrow A automatically tensions the shutter setting ring 37, and the release of the shutter automatically retracts the locking pawl 16 and the latch 26 at the end of the movement. Turning the handle 21 in a clockwise direction to wind the film causes a pin 34 connected to the handle to rotate the arm 33 on the shutter setting or cocking lever 31. A lug 35 secured to the end of the lever 33 engages a radial projection 36 on the shutter setting ring 37 to elevate the projection 36 to the dotted line position in FIG. 2 to tension or cock the shutter. The position of the lever 14 and the latches 16 and 26 is unaffected during this movement since the pin 30 slides in the guideway 29 in the drawbar 28. The handle 21 is returned to the rest position at the end of the winding movement, thereby bringing the lever 31 back to its original position while leaving the shutter setting ring in its tensioned position. On the release of the shutter, the projection 36 swings downwardly to strike the lug 35 to pivot the lever 14 in a clockwise direction to release the latches 16 and 26. By this action, the mechanism is automatically ready for a new film winding operation.

By the invention, the change-over from one feed distance of film advance to another film advance is automatically effected simultaneously with the placement of a format mask to reduce the exposure area to a size smaller than the maximum size. In addition to being a structurally simple arrangement, the possibility of using the wrong film advance set-up is eliminated.

Furthermore, the detent or metering disks 2 may be in the form of simple disks arranged rigidly on the counter wheel shaft. By the positive connection of the latches 16 and 26 and the setting lever of the shutter in one direction of operation, the result is obtained that the disengagement of the latches can be effected only during the last part of the travel of the unwinding of the shutter setting lever. Conversely, with the film winding and shutter setting mechanisms coupled, the winding handle 21 has already initiated the stepping forward of the detent disk during the first part of the movement before the latch is again released for engaging the detent disk. In this way, reengagement with the detent disk prior to completing the film winding operation is prevented, without the need for the double disks formerly required for this purpose.

The member 26 has been referred to as a latch, but it may be appropriately called a feeler portion of the locking pawl 14, 16, since it serves to feel or sense the notches in whichever one of the detent disks is located opposite the feeler portion, with the result that when the feeler portion 26 drops into one of the notches, the locking pawl 14, 16 can swing to engage and stop rotation of the ratchet wheel 17.

As mentioned above, the present drawings are somewhat schematic. Thus in FIG. 1, the film frame parts 64, 66, 74 actually lie in a plane at right angles to the plane of the frame counter disk 1, but are shown in a plane parallel thereto for convenience. Also, in FIG. 2, the shutter cocking or tensioning ring 37 actually rotates in a plane at right angles to the plane of the paper (compare with FIG. 1 of the mentioned Muller Patent 2,148,636) but is shown for simplicity as being in the plane of the paper.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

It is especially pointed out that the lever 33 must be so long that the pin 34 always glides on its bottom edge regardless of whether the crank is being turned backwards or forward so that in both turning directions of the crank the lever 31 is being moved in the same manner from the bottom toward the top and released again.

What is claimed is:

1. A multi-format roll film camera including a variable film advance feeding mechanism comprising a plurality of detent disks spaced axially from one another and mounted for rotation together, one of said disks being provided for each format and each having circumferentially spaced detents, said disks being adapted to be rotated by travel of the film, a detent latch, means for mounting said detent latch for movement transversely of said detent disks so as to be selectively engageable with the detents in any one of said disks, means for winding the film, lock means for said film winding means pivotally movable between an engaged and a released position, said detent latch being operatively connected to said lock means so that said detent latch is engaged with a selected one of said detent disks simultaneously with the movement of said lock means to said engaged position.

2. A construction as defined in claim 1, including a counter wheel rigidly connected for rotation with said detent disks and provided with a frame numeral scale for each of the formats, change-over means for moving said detent latch mounting means, and means carried by said change-over means for movement therewith and defining a window for reading one of said scales corresponding to the one of said detent disks with which said detent latch is engageable.

3. A construction as defined in claim 2, including an image aperture frame adapted to receive a format mask, a feeler lever projecting through said frame, and means for operatively connecting said feeler lever and change-over means so that said change-over means is actuated when a format mask is fitted into said frame to position said detent latch for engagement with one of said disks.

4. A construction as defined in claim 3, further including a spring for urging said change-over means into a rest position wherein said detent latch is engageable with another of said disks.

5. A multi-format roll film camera including an aperture frame, a format mask insertable in and removable from said aperture frame, a variable film advance feeding mechanism comprising a plurality of detent disks spaced axially from one another and mounted for rotation together, one of said disks being provided for each format and each having circumferentially spaced detents, said disks being adapted to be rotated by travel of the film, a detent latch, means for mounting said detent latch for movement transversely of said detent disks so as to be engageable with the detents in any one of said disks, means for winding the film, lock means for said film winding means pivotally movable between an engaged and a released position, said detent latch being operatively connected to said lock means so that said detent latch is engaged with a selected one of said detent disks simultaneously with the movement of said lock means to said engaged position, means controlled by the position of said format mask for determining which one of said detent disks is engaged by said detent latch, said film winding means including a reciprocable winding handle arranged so that the film wind is effective in only one direction of rotation of said handle, a ratchet wheel on said handle, a locking pawl pivoted on the camera and engageable with said ratchet wheel for allowing movement of said handle only in the film-winding direction, said lock means moving said locking pawl to a released position when said lock means moves to its said engaged position.

6. A construction as defined in claim 5, including a stop mounted on said ratchet wheel for abutting said locking pawl in said released position to provide a rest position for said handle.

7. A construction as defined in claim 6, further including means for moving said locking pawl out of the range of said stop to allow reverse rotation of said handle.

8. A construction as defined in claim 7, wherein said stop is pivotally mounted, two spaced abutments on said ratchet wheel for limiting movement of said stop, and spring means for urging said stop against one of said abutments.

9. A multi-format roll film camera of the type having a rotary film winding member for advancing film, a toothed member operatively connected to said winding member to turn therewith, a plurality of film metering detent disks connected to each other to turn together about a common axis of rotation and driven by advancing movement of the film, each of said disks having a series of circumferentially spaced notches at a different circumferential spacing from that of another such disk, a locking pawl mounted for pivotal movement into and out of engagement with said toothed member and serving, when engaged therewith, to stop rotation of said toothed member and said winding member in a film advancing direction, and a feeler portion on said locking pawl for engaging one of said detent disks and for controlling movement of said locking pawl into motion-stopping engagement with said toothed member, characterized by the novel features that said feeler portion of said locking pawl is movable laterally in a direction substantially parallel to the axis of rotation of said detent disks to bring said feeler portion selectively into cooperative relation to any desired one of said detent disks, and that there is means for moving said feeler portion laterally into cooperative relation to any selected one of said disks.

10. A multi-format roll film camera of the type having a rotary film winding member for advancing film, a toothed member operatively connected to said winding member to turn therewith, a plurality of film metering detent disks connected to each other to turn together about a common axis of rotation and driven by advancing movement of the film, each of said disks having a series of circumferentially spaced notches at a different circumferential spacing from that of another such disk, a locking pawl mounted for pivotal movement into and out of engagement with said toothed member and serving, when engaged therewith, to stop rotation of said toothed member and said winding member in a film advancing direction, and a feeler portion on said locking pawl for engaging one of said detent disks and for controlling movement of said locking pawl into motion-stopping engagement with said toothed member, characterized by the novel features that said feeler portion of said locking pawl is movable laterally in a direction substantially parallel to the axis of rotation of said detent disks to bring said feeler portion selectively into cooperative relation to any desired one of said detent disks, and that there is an image aperture frame adapted to receive removably a detachable format mask, and that there is mask feeler means moved by insertion of a mask in said aperture and operatively connected to said feeler portion of said locking pawl to move said feeler portion laterally out of cooperative relation to one of said detent disks and into cooperative relation to another of said detent disks by the act of inserting a format mask in said image aperture.

References Cited in the file of this patent

UNITED STATES PATENTS

| | | |
|---|---|---|
| 2,233,239 | Baumgärtner | Feb. 25, 1941 |
| 2,307,748 | Phillips | Jan. 12, 1943 |
| 2,496,329 | Briechle et al. | Feb. 7, 1950 |
| 2,548,172 | Pollock | Apr. 10, 1951 |
| 2,652,210 | Hodges | Sept. 15, 1953 |
| 2,791,164 | Faulhaber | May 7, 1957 |

FOREIGN PATENTS

| | | |
|---|---|---|
| 595,111 | Germany | Mar. 29, 1934 |
| 727,352 | Germany | Nov. 18, 1942 |